United States Patent
Achten et al.

(10) Patent No.: US 11,472,117 B2
(45) Date of Patent: Oct. 18, 2022

(54) 3-D PRINTING PROCESS WITH PATH-DEPENDENT CONTROL OF THE PRINTING PATH

(71) Applicant: Covestro Deutschland AG, Leverkusen (DE)

(72) Inventors: Dirk Achten, Leverkusen (DE); Thomas Buesgen, Leverkusen (DE); Levent Akbas, Witten (DE); Roland Wagner, Leverkusen (DE); Nicolas Degiorgio, Krefeld (DE); Jonas Kuenzel, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 321 days.

(21) Appl. No.: 16/621,748

(22) PCT Filed: Jun. 26, 2018

(86) PCT No.: PCT/EP2018/067074
§ 371 (c)(1),
(2) Date: Dec. 12, 2019

(87) PCT Pub. No.: WO2019/002271
PCT Pub. Date: Jan. 3, 2019

(65) Prior Publication Data
US 2020/0130283 A1    Apr. 30, 2020

(30) Foreign Application Priority Data

Jun. 27, 2017   (EP) ..................................... 17178020

(51) Int. Cl.
*B29C 64/393*    (2017.01)
*B33Y 10/00*     (2015.01)
(Continued)

(52) U.S. Cl.
CPC .......... *B29C 64/393* (2017.08); *B29C 64/118* (2017.08); *B33Y 10/00* (2014.12); *B33Y 50/02* (2014.12)

(58) Field of Classification Search
None
See application file for complete search history.

(56) References Cited

U.S. PATENT DOCUMENTS 5,121,329 A     6/1992 Crump
6,054,077 A *   4/2000 Comb .................. B29C 48/155
                                              425/375

(Continued)

FOREIGN PATENT DOCUMENTS

CN    203496288 U    3/2014
CN    104129077 A   11/2014
(Continued)

OTHER PUBLICATIONS

International Search Report, PCT/EP2018/067074, dated Sep. 13, 2018, Authorized officer: Benoit Gasner.

*Primary Examiner* — Matthew J Daniels
*Assistant Examiner* — Andrew L Swanson
(74) *Attorney, Agent, or Firm* — Jed C. Benson (57) ABSTRACT

A method for producing an object from a filamentary building material in an additive fused deposition modelling process, comprising the steps of: providing the building material; transporting the building material into a printhead at a feed rate for the building material, wherein the building material is transported between a driven drive wheel and a second wheel; melting the building material by means of a heating device in the printhead; discharging the molten building material to a discharge location, corresponding to a selected cross section of the object to be produced, at a discharge rate through an orifice of the printhead, with relative movement of the printhead in relation to the dis- (Continued)

charge location at a predetermined speed to movement along a predetermined path, wherein the path has at each location a curvature that can assume a positive value, zero or a negative value; wherein a control unit controls at least the drive of the drive wheel, the heating device in the printhead and the movement of the printhead in dependence on the curvature of the printing path. Likewise disclosed is a control unit for use in an installation for carrying out an additive fused deposition modelling process with a filamentary building material.

11 Claims, 4 Drawing Sheets (51) Int. Cl.
    *B33Y 50/02*     (2015.01)
    *B29C 64/118*     (2017.01)

(56) References Cited

U.S. PATENT DOCUMENTS

| | | |
|---|---|---|
| 6,814,907 B1 | 11/2004 | Comb |
| 10,252,467 B2 | 4/2019 | Ho et al. |
| 2001/0030383 A1* | 10/2001 | Swanson ............... B33Y 70/00 |
| | | 242/570 |
| 2013/0009338 A1* | 1/2013 | Mayer .................... B33Y 30/00 |
| | | 425/375 |
| 2014/0265040 A1* | 9/2014 | Batchelder ............ B29C 64/106 |
| | | 264/412 |
| 2015/0035198 A1 | 2/2015 | Saba |
| 2015/0097308 A1 | 4/2015 | Batchelder et al. |
| 2017/0151704 A1* | 6/2017 | Go ........................ B29C 48/266 |
| 2017/0173884 A1* | 6/2017 | Ryan ..................... B29C 64/118 |
| 2017/0252820 A1* | 9/2017 | Myerberg ............... B33Y 30/00 |

FOREIGN PATENT DOCUMENTS

| | | |
|---|---|---|
| CN | 103963303 A | 5/2016 |
| CN | 106560315 A | 4/2017 |
| CN | 106457666 A | 1/2020 |

* cited by examiner

3-D PRINTING PROCESS WITH PATH-DEPENDENT CONTROL OF THE PRINTING PATH

CROSS-REFERENCE TO RELATED APPLICATION

This application is a national stage application under 35 U.S.C. § 371 of PCT/EP2018/067074, filed Jun. 26, 2018, which claims the benefit of European Application No. 17178020, filed Jun. 27, 2017, each of which is incorporated herein by reference.

FIELD

The present invention relates to a process for producing an article from a filamentary construction material in an additive fused deposition modelling process, comprising the following steps: supplying the construction material; delivering the construction material into a printhead at a feed rate for the construction material; wherein the construction material is conveyed between a driven drive wheel and a second wheel; melting the construction material by means of a heating device in the printhead; discharging the melted construction material to a discharge location in accordance with a selected cross section of the article to be produced, at a discharge rate through an orifice of the printhead, with movement of the printhead relative to the discharge location at a predetermined speed of movement along a predetermined path, wherein the path has at each location a curvature that can assume a positive value, zero or a negative value; wherein a control unit controls at least the driving of the drive wheel, the heating device in the printhead and the movement of the printhead. The invention likewise relates to a control unit for use in a system for carrying out an additive fused deposition modeling process with a filamentary construction material.

BACKGROUND

Additive manufacturing processes or 3-D printing processes are processes by means of which articles are constructed in layerwise fashion. They therefore differ markedly from other processes for producing articles such as milling or drilling. In the latter processes, an article is processed such that it takes on its final geometry via removal of material.

Additive manufacturing processes utilize different materials and process techniques to effect layerwise construction of articles. In fused deposition modeling (FDM) processes, for example, a thermoplastic wire is liquefied and deposited onto a movable construction platform layer by layer with the aid of a nozzle. Solidification gives rise to a solid article. The nozzle and construction platform are controlled on the basis of a CAD drawing of the article. An early patent document for this technology is U.S. Pat. No. 5,121,329. If the geometry of this article is complex, for example with geometric undercuts, support materials additionally have to be printed and removed again after completion of the article.

Dynamic control of the printing process forms the subject matter of US 2015/097308 A1, for example. This patent application discloses an additive manufacturing system for the layered printing of three-dimensional parts, comprising: a drive system configured to supply a consumable material; a liquefier tube configured to receive the consumable material; a heating device configured to melt the consumable material; a nozzle configured to extrude the melted consumable material; at least one sensor, which is configured to measure the pressure within the liquefier tube, and a controller, which is configured to adjust feed rates of the consumable material by means of the drive mechanism on the basis of the measured pressure. The material flow rate of the extrudate is controlled in a closed control loop.

Another method of controlling the printing process forms the subject matter of US 2015/0266244 A1. This patent application relates to a system for producing an article using an extruder for one or more construction materials. The extruder has at least one nozzle with a nozzle tip that has an outlet opening and a length which is greater than or equal to the width of the outlet opening. The system furthermore has a controller, which is coupled to the extruder and is configured to use a correction factor calculated for a path of the nozzle on the basis of a slope of the surface of the article to be produced. The correction factor for a positive slope is different from that for a negative slope. The extruder is configured to bring about a movement of the nozzle along the path in order to deposit material on the slope of the surface. The correction factor removes differences in the thickness of the deposited material caused by the slope relative to the path.

SUMMARY

The object is achieved in accordance with the invention by a process and by a control unit as described herein. Preferred embodiments of the process according to the invention are also indicated herein. They may be combined as desired, unless the opposite is unambiguously apparent from the context.

BRIEF DESCRIPTION OF THE DRAWINGS

Various features and characteristics of the inventions described in this specification may be better understood by reference to the accompanying figures, in which:

FIG. 1 shows a nonlinear characteristic for a construction material. The positive correlation between the temperature of the heating device and the feed rate for the construction material can be stored for various materials in a database accessible to the control unit. Another example of a nonlinear characteristic is an exponentially rising characteristic which indicates a small temperature rise in the case of small feed rates and, following the laws of exponential growth, indicates a sharp temperature rise in the case of higher feed rates;

FIG. 2 shows a flow diagram in connection with the process according to the invention. This flow diagram relates to the aspect of adapting the delivery rate for the construction material into the printhead. Here, the term "delivery rate" is used as a synonym for "feed rate". In general, the control unit controls the feed rate for the construction material in such a way that the feed rate correlates negatively with the absolute value of the curvature of the printing path. At the beginning of the 3-D printing process, the control unit accesses a database containing information on materials, which can contain the characteristic depicted by way of example in FIG. 1. An allowed speed of travel for the printhead is furthermore determined for the respectively encountered curvature of the printing path. Based on this, a setpoint delivery rate for construction material into the printhead is determined. The actual delivery rate (and thus indirectly the discharge rate) is compared with the setpoint in a control circuit and adapted if required. A further control operation relates to the speed of travel for the printhead, which is likewise determined continuously and adapted if required. This is the case if the curvature of the printing path changes. In the case of a change in the allowed speed of travel, there is also automatically an adaptation of the delivery rate;

FIG. 3 shows a further flow diagram in connection with the process according to the invention. In this case, the printhead is divided into two functional regions: a hot end melts the construction material introduced, and an extruder conveys melted material outward. First of all, the control unit loads information on the material and printing path (slice data) and adjusts the temperature in the hot end to a setpoint. After the setpoint has been reached, the extrusion process begins, in which the speed of a driven drive wheel nA and that of a non-driven drive wheel nL in the printhead are compared here. If they coincide within a predetermined tolerance window, the actual printing process can be carried out. A speed difference indicates a fault in the printhead and, in this case, a solution in the form of a solution matrix with different ways of eliminating problems is therefore called; and FIG. 4 shows a further flow diagram in connection with the process according to the invention, in which a method for fault handling is described. If a fault is detected, an appropriate remedy is selected within a matrix containing stored solutions (solution matrix). In the present case, the remedy comprises cleaning the printhead by heating and flushing, e.g. by driving the printhead over a brush head situated outside the printing zone for the article. After completion of the cleaning process, the interrupted printing process is repeated. To decide whether this has been successful, the allowed speeds of travel based on the printing path curvature and a database containing information on the construction material are also referred to. In the case of successful elimination of the fault, the printing process is continued as planned. Otherwise, the proposal is to exchange the printhead or the printing nozzle.

DETAILED DESCRIPTION

A process for producing an article from a filamentary construction material in an additive fused deposition modeling process, comprises the following steps:
supplying the construction material;
delivering the construction material into a printhead at a feed rate for the construction material;
melting the construction material by means of a heating device in the printhead;
discharging the melted construction material to a discharge location in accordance with a selected cross section of the article to be produced,
at a discharge rate
through an orifice of the printhead,
with movement of the printhead relative to the discharge location
at a predetermined speed of movement
along a predetermined path,
wherein the path has at each location a curvature that can assume a positive value, zero or a negative value;
wherein a control unit controls at least the delivery of the construction material, the heating device in the printhead and the movement of the printhead.

The process is distinguished by the fact that, in dependence on the curvature of the path at the location at which the printhead is situated during its movement relative to the discharge location:

the control unit controls the relative movement of the printhead in such a way that
the speed at which the printhead undergoes a relative movement,
correlates negatively with the absolute value of the curvature,
the control unit controls the feed rate for the construction material in such a way that
the feed rate
correlates negatively with the absolute value of the curvature, and
the control unit controls the heating device in the printhead in such a way that
the temperature of the heating device correlates positively with the feed rate for the construction material and/or positively with the speed at which the printhead undergoes a relative movement.

In the process according to the invention an article is constructed layerwise. The process is accordingly a fused deposition modeling (FDM) process. The sequence of steps in the process according to the invention is repeated until the article has been formed. If the number of repetitions for application is sufficiently low, it is also possible to refer to a two-dimensional article which is to be constructed. Such a two-dimensional article can also be characterized as a coating. For construction thereof, ≥2 to ≤20 repetitions may be conducted for application, for example.

An electronic model of the article to be formed is advantageously held in a CAD program. The CAD program can then calculate cross sections of the model that become cross sections of the article by application of the filament.

The individual filaments that are applied may have a diameter of ≥50 µm to ≤5000 µm, for example.

The construction material can contain a meltable polymer selected from the group comprising polyurethane, polyester, polyalkylene oxide, plasticized PVC, polyamide, protein, PEEK, PEAK, polypropylene, polyethylene, thermoplastic elastomer, POM, polyacrylate, polycarbonate, polymethylmethacrylate, polystyrene, ABS, polyamide, copolyester amide, thermoplastic elastomers, thermoplastic polyurethane elastomers or a combination of at least two of these.

In addition to the meltable polymer the construction material may comprise further additives such as fillers, stabilizers and the like, but also further polymers. The total content of additives in the layer may be for example ≥0.1% by weight to ≤50% by weight, preferably ≥0.3% by weight to ≤25% by weight, particularly preferably 0.5% to 15% by weight.

In the process according to the invention, the construction material supplied is delivered into a printhead, which, in the simplest case, may be regarded as a controllable extrusion nozzle. As a drive for delivery, use is made, for example, of a driven wheel (drive wheel) and a second wheel, which may likewise be driven or, alternatively, may not be driven. The construction material is then situated between these wheels and is delivered into the printhead at least by the movement of the drive wheel. In the printhead, the construction material is then melted by means of a heating device.

The melted construction material is discharged onto a discharge location. The discharge location can be a support for the article to be built up. This is typically the case for the first pass of the layered buildup of the article. As the building up of the article progresses, the discharge location is typically a previously deposited layer of the construction material. In accordance with the principles of additive manufacture, deposition takes place in accordance with a selected cross section of the article to be produced.

To describe the discharge process, consideration is given to a discharge rate, which describes the material flow of the melted construction material through a printhead (nozzle) orifice provided for this purpose. The discharge rate can be given in mg of construction material per second, for example. In simple but expediently designed printheads, the discharge rate can be controlled directly via the feed rate for the construction material.

Another descriptor of the discharge process is the speed at which the printhead moves relative to the discharge location. The printhead speed, e.g. in centimeters per second, can be monitored via the controller of the 3-D printer.

In accordance with the concept of FDM printing, the printhead moves (in a relative way) along a predetermined path. In the sections in which material is discharged from the printhead, the path corresponds to the respective cross section of the article to be produced. One geometric descriptor of this printing path is the curvature of the path. The curvature of the path is preferably defined in such a way that, in the case of a path extending in an x/y coordinate system, the second derivative of the y coordinate with respect to the x coordinate $d^2y/dx^2$ represents the curvature. A path curvature of zero corresponds to a straight line. The sign of a curvature that differs from zero is determined by the positioning of the x/y coordinate system, for which reason the absolute value of the curvature is taken as a basis as a control variable in the process.

In the process according to the invention, a control unit controls at least the feed rate for the construction material (e.g. the driving of the drive wheel), the heating device in the printhead and the (relative) movement of the printhead. This is preferably performed not only in a binary way (on/off) but progressively, e.g. by means of pulse width modulation.

According to the invention, it is envisaged that the control unit influences the 3-D printing process in dependence on the path curvature. This makes it possible, at locations along the path at which construction material can be discharged more quickly without loss of accuracy, for this in fact to take place. Conversely, it is possible to work with the appropriate accuracy at locations along the path at which a more delicate printing process is indicated.

The control unit controls the (relative) movement of the printhead in negative correlation with the absolute value of the path curvature: the (relative) movement of the printhead and the absolute value of the path curvature are opposed. When the absolute value of the path curvature rises, the speed at which the printhead undergoes a relative movement falls. On less curved or straight sections, the printhead moves (relatively) more quickly than in curved sections of the path. The same applies to the discharge rate of the melted construction material, which is determined via the feed rate: if the printhead can move more quickly, more material must be delivered. Likewise, the heating device must also be able to manage the increased material requirement, and therefore, at an increased feed rate and/or increased (relative) printhead speed, a corresponding heat output can also be made available to melt the construction material.

In the simplest case, the relationship between the path curvature and the (relative) movement of the printhead can be a linear relationship. The path curvature and the (relative) movement of the printhead are then linked by means of a constant proportionality factor. The same applies to the linkage between the path curvature and the feed rate for the construction material as well as the temperature of the heating device.

It is possible for the control unit to adapt the curvature of the printing path in order to introduce smoothing that benefits the printing process in the case of very sharp curves.

Overall, the process according to the invention thus makes it possible to increase the efficiency of the FDM process without having to make compromises in the accuracy of 3-D printing.

In a preferred embodiment of the process, the negative correlation between the speed at which the printhead undergoes a relative movement and the absolute value of the curvature of the path is expressed by a nonlinear function. Suitable functions are, in particular, those which do not have any inflection points and remain single-valued. Quadratic or exponential functions are examples of these. The fact that the functions are continuous does not guarantee that they are suitable according to the invention. Also included according to the invention are composite functions, the individual sections of which relate to different regions of the path curvatures.

In another preferred embodiment of the process, the negative correlation between the feed rate for the construction material and the absolute value of the curvature of the path is expressed by a nonlinear function. Suitable functions are, in particular, those which do not have any inflection points and remain single-valued. Quadratic or exponential functions are examples of these. The fact that the functions are continuous does not guarantee that they are suitable according to the invention. Also included according to the invention are composite functions, the individual sections of which relate to different regions of the path curvatures.

In another preferred embodiment of the process, the positive correlation between the temperature of the heating device and the feed rate for the construction material is expressed by a nonlinear function. Suitable functions are, in particular, those which do not have any inflection points and remain single-valued. Quadratic or exponential functions are examples of these. The fact that the functions are continuous does not guarantee that they are suitable according to the invention. Also included according to the invention are composite functions, the individual sections of which relate to different regions of the path curvatures In another preferred embodiment of the process, the positive correlation between the temperature of the heating device and the speed at which the printhead undergoes a relative movement is expressed by a nonlinear function. Quadratic or exponential functions are examples of these.

The temperature adaptation in the heating device in dependence on the relative speed of the printhead can also be provided with a low-pass filter. For example, a precalculated average relative speed of the printhead for the next 2 seconds or the next 5 seconds during the printing process can be used as a basis for calculation. A further predictive element is thereby implemented in the process according to the invention.

In another preferred embodiment, the control unit distinguishes between regions of the article to be produced which are externally visible on the finished article and regions which are not externally visible. In this case, the regions which are not visible are manufactured at a higher relative speed of the printhead than comparable regions which are visible. Thus, in the case of sections in which the external appearance is not important, the manufacturing time can be reduced.

In another preferred embodiment, this nonlinear function contains terms which are selected from the shear-rate-dependent viscosity of the construction material, the temperature-dependent viscosity of the construction material, the heat capacity of the construction material, the heat transfer coefficient of the construction material, the surface available for heat transfer between the printhead and the construction material, the heat transfer coefficient between the printhead and the construction material or a combination of two or more such terms. As regards the surface available for heat exchange between the printhead and the construction material, it is furthermore preferred if, in this case, the internal surface of the printhead where the construction material comes into contact with the printhead and which has a temperature around ≥5° C. above the local construction material temperature is considered.

In another preferred embodiment of the process, the control unit is designed to detect, by means of at least one predefined criterion, whether the discharge rate of the construction material falls below a predetermined discharge rate by more than a predetermined amount and to allow at least one predetermined action to take place if the at least one criterion is satisfied. In this way, a fault in the printing process can be detected and eliminated.

The at least one predetermined action is preferably selected from the following: freeing the nozzle from blockages present in the nozzle, reducing the driving speed of the drive wheel, increasing the temperature in the heating device or a combination thereof.

There is likewise a preference for selection of the at least one predefined criterion from the following: incorrect delivery of the construction material (e.g. a speed difference between the drive wheel and the second wheel), exceeding of a predefined pressure within the printhead or a combination thereof.

In another preferred embodiment of the process, the control unit determines the curvature of the path at a location which is at a predetermined distance ahead of the printhead along the path and defines the temperature of the heating device in accordance with a predetermined function. This variant thus contains a predictive element. In this way, a time delay between the beginning of the increase in the heat output and the increase in the temperature of the construction material in the printhead can be compensated. Likewise in a predictive way, the temperature can be lowered if a lower temperature of the melted construction material is indicated in the further course of the path.

In another preferred embodiment of the process, correlation factors for the negative correlation between the speed at which the printhead undergoes a relative movement and the absolute value of the curvature, the negative correlation between the feed rate with the absolute value of the curvature and/or the positive correlation between the temperature of the heating device and the feed rate for the construction material and/or the speed at which the printhead undergoes a relative movement are determined before and/or during the process according to the invention by calibration of an additive fused deposition modeling machine used in the process according to the invention.

A further aspect of the present invention is a control unit for use in a system for carrying out an additive fused deposition modeling process with a filamentary construction material, wherein the process comprises the following steps:

supplying the construction material;
delivering the construction material into a printhead at a
feed rate for the construction material (wherein the construction material is preferably delivered between a driven drive wheel and a second wheel);
melting the construction material by means of a heating device in the printhead;
discharging the molten construction material to a discharge location in accordance with a selected cross section of the object to be produced,
at a discharge rate
through an orifice of the printhead,
with movement of the printhead relative to the discharge location
at a predetermined speed of movement
along a predetermined path,
wherein the path has at each location a curvature that can assume a positive value, zero or a negative value;
and wherein the control unit controls at least the delivery of the construction material, the heating device in the printhead and the movement of the printhead.

The control unit is designed, in dependence on the curvature of the path at the location at which the printhead is situated during its movement relative to the discharge location:

to control the relative movement of the printhead in such a way that
the speed at which the printhead undergoes a relative movement,
correlates negatively with the absolute value of the curvature,
to control the feed rate for the construction material in such a way that
the feed rate
correlates negatively with the absolute value of the curvature, and
to control the heating device in the printhead in such a way that
the temperature of the heating device
correlates positively with the feed rate for the construction material and/or
positively with the speed at which the printhead undergoes a relative movement.

It is furthermore possible for the control unit to be designed likewise to run previously described preferred embodiments of the process according to the invention.

Figure 1:
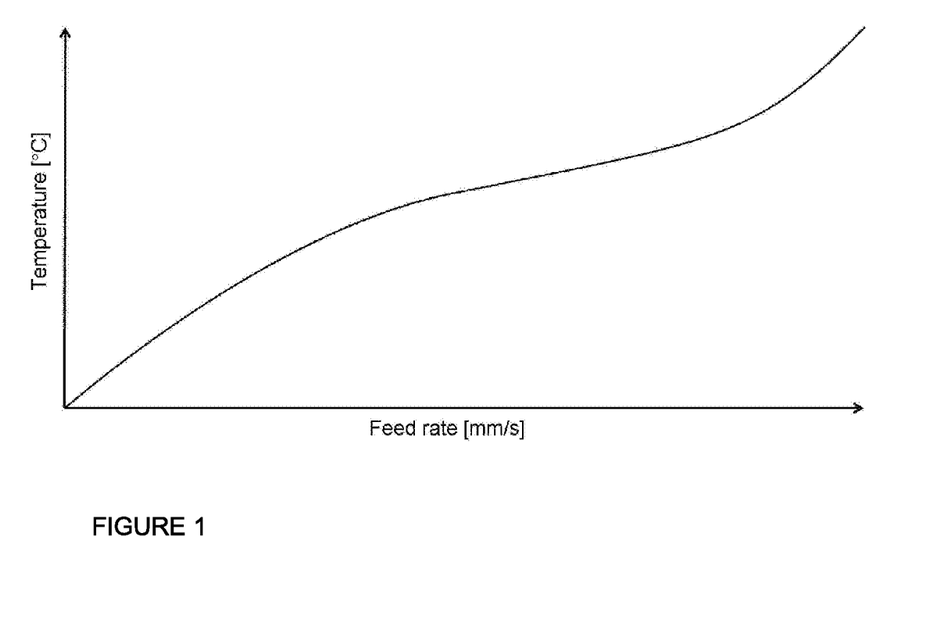

Aspects of the process according to the invention are elucidated further with reference to the following figures, but without being restricted thereto. In the drawings:

FIG. 1 shows a nonlinear characteristic for a construction material

Figure 2:
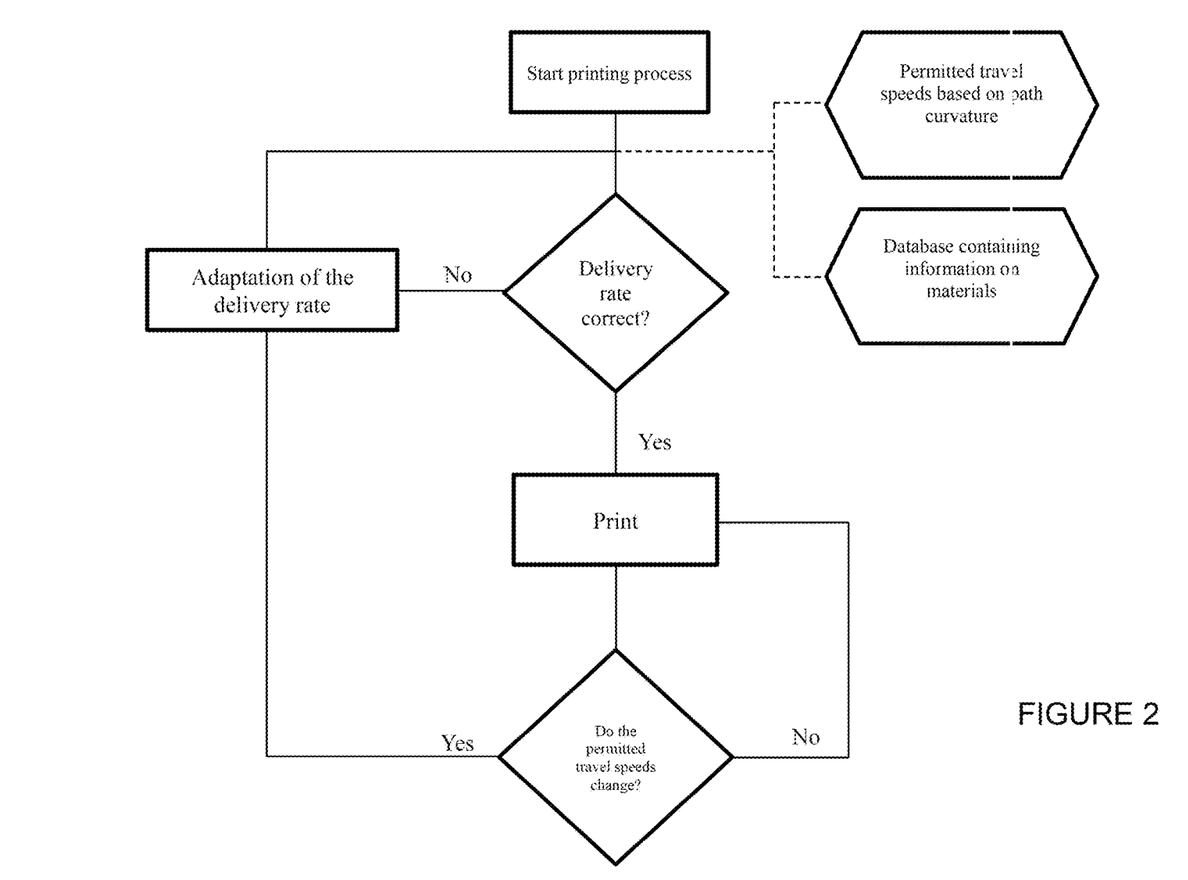

FIG. 2 shows a flow diagram in the process according to the invention

Figure 3:
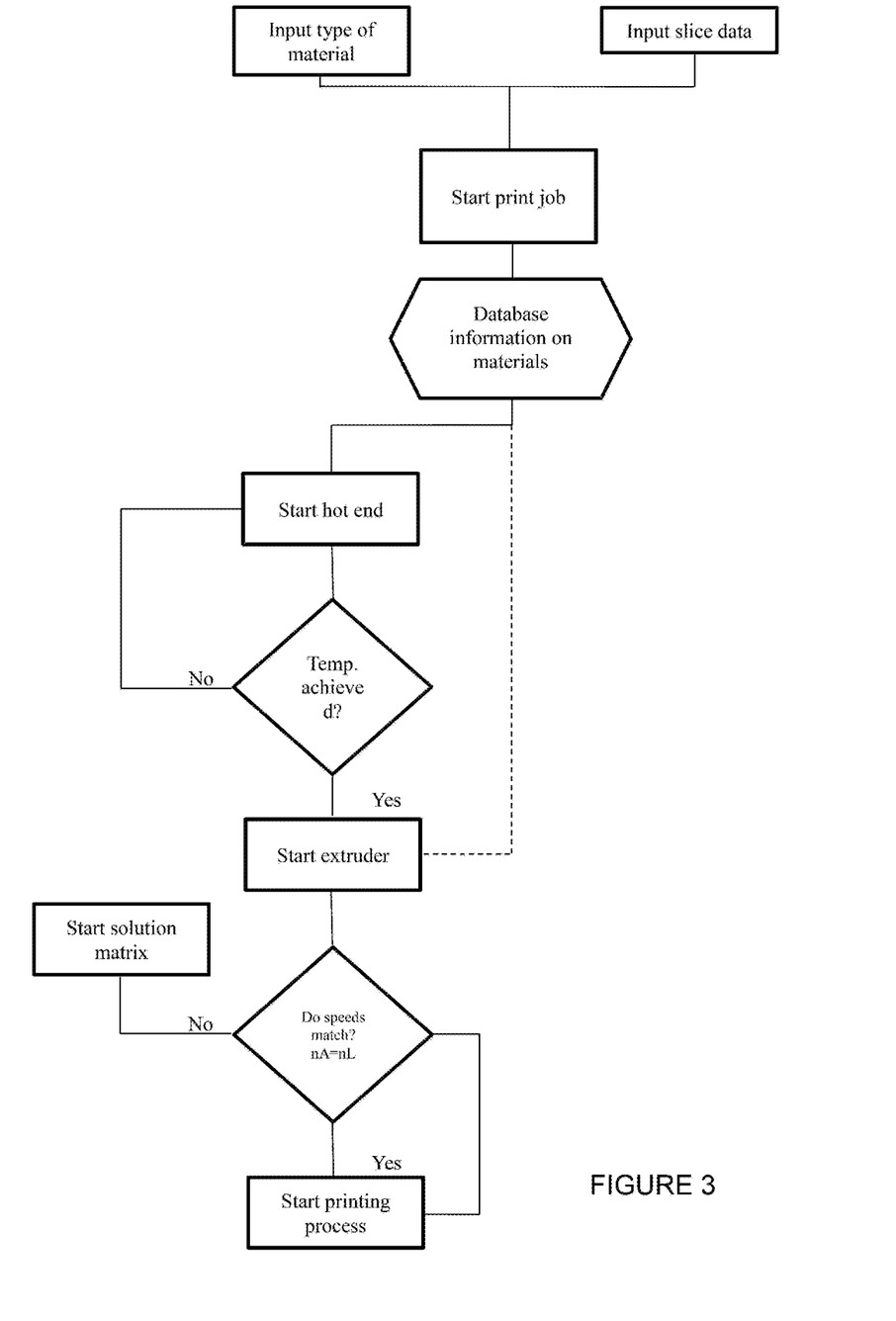

FIG. 3 shows a further flow diagram in the process according to the invention

Figure 4:
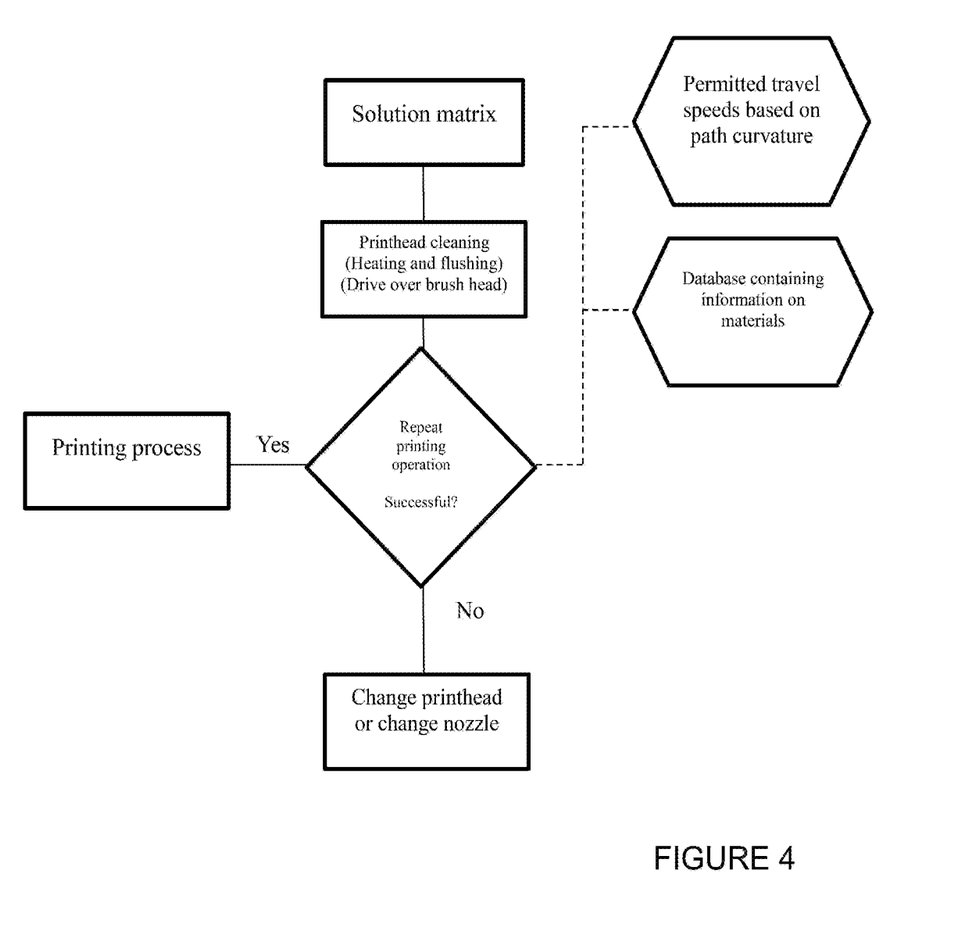

FIG. 4 shows a further flow diagram in the process according to the invention

FIG. 1 shows a nonlinear characteristic for a construction material. The positive correlation between the temperature of the heating device and the feed rate for the construction material can be stored for various materials in a database accessible to the control unit. Another example of a nonlinear characteristic is an exponentially rising characteristic which indicates a small temperature rise in the case of small feed rates and, following the laws of exponential growth, indicates a sharp temperature rise in the case of higher feed rates.

FIG. 2 shows a flow diagram in connection with the process according to the invention. This flow diagram relates to the aspect of adapting the delivery rate for the construction material into the printhead. Here, the term "delivery rate" is used as a synonym for "feed rate". In general, the control unit controls the feed rate for the construction material in such a way that the feed rate correlates negatively with the absolute value of the curvature of the printing path. At the beginning of the 3-D printing process, the control unit accesses a database containing information on materials, which can contain the characteristic depicted by way of example in FIG. 1. An allowed speed of travel for the printhead is furthermore determined for the respectively encountered curvature of the printing path. Based on this, a setpoint delivery rate for construction material into the printhead is determined. The actual delivery rate (and thus indirectly the discharge rate) is compared with the setpoint in a control circuit and adapted if required. A further control operation relates to the speed of travel for the printhead, which is likewise determined continuously and adapted if required. This is the case if the curvature of the printing path changes. In the case of a change in the allowed speed of travel, there is also automatically an adaptation of the delivery rate.

FIG. 3 shows a further flow diagram in connection with the process according to the invention. In this case, the printhead is divided into two functional regions: a hot end melts the construction material introduced, and an extruder conveys melted material outward. First of all, the control unit loads information on the material and printing path (slice data) and adjusts the temperature in the hot end to a setpoint. After the setpoint has been reached, the extrusion process begins, in which the speed of a driven drive wheel nA and that of a non-driven drive wheel nL in the printhead are compared here. If they coincide within a predetermined tolerance window, the actual printing process can be carried out. A speed difference indicates a fault in the printhead and, in this case, a solution in the form of a solution matrix with different ways of eliminating problems is therefore called.

FIG. 4 shows a further flow diagram in connection with the process according to the invention, in which a method for fault handling is described. If a fault is detected, an appropriate remedy is selected within a matrix containing stored solutions (solution matrix). In the present case, the remedy comprises cleaning the printhead by heating and flushing, e.g. by driving the printhead over a brush head situated outside the printing zone for the article. After completion of the cleaning process, the interrupted printing process is repeated. To decide whether this has been successful, the allowed speeds of travel based on the printing path curvature and a database containing information on the construction material are also referred to. In the case of successful elimination of the fault, the printing process is continued as planned. Otherwise, the proposal is to exchange the printhead or the printing nozzle.

The invention claimed is:

1. A process for producing an article from a filamentary construction material in an additive fused deposition modeling process, comprising:
   supplying the filamentary construction material;
   delivering the filamentary construction material into a printhead at a feed rate for the filamentary construction material;
   melting the filamentary construction material by means of a heating device in the printhead to form a melted construction material;
   discharging the melted construction material to a discharge location in accordance with a selected cross section of the article to be produced at a discharge rate through an orifice of the printhead, with movement of the printhead relative to the discharge location at a predetermined speed of movement along a predetermined path,
   wherein the predetermined path has at each location a curvature having a positive value, a zero value, or a negative value;
   wherein a control unit controls at least delivery of the filamentary construction material, the heating device in the printhead and movement of the printhead;
   wherein in dependence on the curvature of the path at a location at which the printhead is situated during its movement relative to the discharge location:
   the control unit controls relative movement of the printhead in such a way that the predetermined speed at which the printhead undergoes relative movement correlates negatively with an absolute value of the curvature,
   the control unit controls the feed rate for the filamentary construction material in such a way that the feed rate correlates negatively with the absolute value of the curvature, and
   the control unit controls the heating device in the printhead in such a way that a temperature of the heating device correlates positively with the feed rate for the construction material, positively with the predetermined speed at which the printhead undergoes relative movement, or both, wherein the control unit determines the curvature of the path at a location which is at a predetermined distance ahead of the printhead along the path and defines the temperature of the heating device in accordance with a predetermined function.

2. The process as claimed in claim 1, wherein the filamentary construction material is conveyed between a driven drive wheel and a second wheel.

3. The process as claimed in claim 1, wherein the negative correlation between the predetermined speed at which the printhead undergoes relative movement and the absolute value of the curvature of the path is expressed by a nonlinear function.

4. The process as claimed in claim 1, wherein the negative correlation between the feed rate for the filamentary construction material and the absolute value of the curvature of the path is expressed by a nonlinear function.

5. The process as claimed in claim 1, wherein the positive correlation between the temperature of the heating device and the feed rate for the construction material is expressed by a nonlinear function.

6. The process as claimed in claim 1, wherein the positive correlation between the temperature of the heating device and the predetermined speed at which the printhead undergoes relative movement is expressed by a nonlinear function.

7. The process as claimed in claim 6, wherein the nonlinear function contains terms which are selected from a shear-rate-dependent viscosity of the filamentary construction material, a temperature-dependent viscosity of the filamentary construction material, a heat capacity of the filamentary construction material, a heat transfer coefficient of the filamentary construction material, a surface available for heat transfer between the printhead and the filamentary construction material, a heat transfer coefficient between the printhead and the filamentary construction material, or a combination of two or more such terms.

8. The process as claimed in claim 1, wherein the control unit is designed to detect whether the discharge rate of the melted construction material falls below a predetermined discharge rate by more than a predetermined amount based on at least one predefined criterion and to perform at least one predetermined action when the at least one criterion is satisfied.

9. The process as claimed in claim 8, wherein the at least one predetermined action comprises freeing a nozzle of the printhead from blockages present in the nozzle, reducing a driving speed of a drive wheel, increasing the temperature in the heating device, or a combination thereof.

10. The process as claimed in claim 8, wherein the at least one predefined criterion comprises incorrect delivery of the filamentary construction material, exceeding of a predefined pressure within the printhead, or a combination thereof.

11. The process as claimed in claim 1, wherein correlation factors for
- the negative correlation between the predetermined speed at which the printhead undergoes relative movement and the absolute value of the curvature,
- the negative correlation between the feed rate with the absolute value of the curvature,
- the positive correlation between the temperature of the heating device and the feed rate for the filamentary construction material, the predetermined speed at which the printhead undergoes a relative movement, or both,
- or a combination of two or more of these are determined before the process, during the process, or both by calibration of an additive fused deposition modeling machine.

\* \* \* \* \*